United States Patent
Roth et al.

(10) Patent No.: US 7,204,016 B2
(45) Date of Patent: Apr. 17, 2007

(54) FERRULE ASSEMBLY AND METHODS THEREFOR

(75) Inventors: Richard F. Roth, Brookline, NH (US); Joseph J. George, Amherst, NH (US); Sepehr Kiani, Watertown, MA (US)

(73) Assignee: Amphenol Corporation, Wallington, CT (US)

( * ) Notice: Subject to any disclaimer, the term of this patent is extended or adjusted under 35 U.S.C. 154(b) by 575 days.

(21) Appl. No.: 10/324,816

(22) Filed: Dec. 20, 2002

(65) Prior Publication Data

US 2004/0117981 A1  Jun. 24, 2004

(51) Int. Cl.
   *B23P 19/00* (2006.01)
(52) U.S. Cl. .............................. 29/749; 29/751; 29/753; 385/60
(58) Field of Classification Search .................. 29/749, 29/751, 753; 385/60
   See application file for complete search history.

(56) References Cited

U.S. PATENT DOCUMENTS

| | | | |
|---|---|---|---|
| 4,252,407 A | 2/1981 | Bubanko et al. | |
| 4,386,461 A * | 6/1983 | Plummer ...................... | 29/749 |
| 5,121,454 A | 6/1992 | Iwano et al. .................. | 385/60 |
| 5,412,862 A * | 5/1995 | Comerci et al. ............. | 29/751 |
| 5,689,598 A | 11/1997 | Dean, Jr. et al. | |
| 5,806,175 A | 9/1998 | Underwood .................. | 29/748 |
| 5,909,526 A | 6/1999 | Roth et al. ..................... | 385/78 |
| 5,915,058 A | 6/1999 | Clairardin et al. ............ | 385/77 |
| 5,971,624 A | 10/1999 | Giebel et al. .................. | 385/59 |
| 6,079,881 A | 6/2000 | Roth | |

(Continued)

FOREIGN PATENT DOCUMENTS

DE   201 18 858   2/2002

(Continued)

OTHER PUBLICATIONS

European Search Report, dated Jun. 14, 2006.

(Continued)

*Primary Examiner*—Carl J. Arbes
(74) *Attorney, Agent, or Firm*—Blank Rome LLP

(57) ABSTRACT

A ferrule assembly for terminating at least one fiber of a ribbon cable in a ferrule, where the ferrule assembly is disposable in a housing of an optical connector, is provided. The ferrule assembly includes the ferrule having a mating face, at least one groove for receiving the fiber and at least one through-hole. The ferrule assembly also includes an alignment member holder having at least one alignment member and providing a first channel for the ribbon cable, the alignment member being insertable in the through-hole of the ferrule and having a first length such that an end of the alignment member extends beyond the mating face of the ferrule when the ferrule assembly is assembled. The ferrule assembly further includes a carrier body attachable to the alignment member holder, the carrier body having at least two biasing member capture portions, each of the biasing member capture portions providing an opening for capturing a biasing member therein when the alignment member holder and the carrier body are attached. The carrier body further provides a second channel for the ribbon cable, the second channel being disposed between the biasing member capture portions of the carrier body and being contiguous with the first channel when the alignment member holder and the carrier body are attached.

31 Claims, 8 Drawing Sheets

U.S. PATENT DOCUMENTS

| | | | |
|---|---|---|---|
| 6,081,647 A | 6/2000 | Roth et al. | |
| 6,116,790 A | 9/2000 | Vergeest | |
| 6,331,079 B1 | 12/2001 | Grois et al. | 385/53 |
| 6,357,928 B1 | 3/2002 | Haley et al. | 385/59 |
| 6,361,218 B1 * | 3/2002 | Matasek et al. | 385/60 |
| 6,461,056 B1 | 10/2002 | Besler et al. | |
| 2002/0191919 A1 | 12/2002 | Nolan | |
| 2006/0002659 A1 | 1/2006 | Kiani et al. | |

FOREIGN PATENT DOCUMENTS

| | | |
|---|---|---|
| EP | 0 791 843 A2 | 8/1997 |
| EP | 0 927 899 A1 | 7/1999 |
| EP | 0 973 051 A1 | 1/2000 |
| EP | 1 006 381 | 6/2000 |
| EP | 1 107 032 A2 | 6/2001 |
| JP | 04174407 | 6/1992 |
| WO | WO 97/34176 | 9/1997 |

OTHER PUBLICATIONS

International Search Report, dated Jan. 20, 2005.

* cited by examiner

FERRULE ASSEMBLY AND METHODS THEREFOR

BACKGROUND OF THE INVENTION

The present invention relates to a ferrule assembly disposable in a housing of an optical connector.

Fiber optic connectors that house optical fibers of a ribbon cable are known. One common type of multi-fiber optical connector is the mechanical transfer push/pull ("MTP") connector. A conventional MTP connector includes a connector housing and an MT ferrule assembly disposed at least partially within the connector housing. FIG. 1, which is FIG. 2 of U.S. Pat. No. 5,806,175 (with different reference numbers), is an illustration of an MTP connector. The '175 patent is incorporated herein by reference.

As shown in FIG. 1, the MTP connector 10 includes a connector housing assembly 14 and an MT ferrule assembly 16 that is configured to be disposed within the connector housing assembly 14. The MT ferrule assembly 16 typically includes an MT ferrule 18 that is forward biased by a coiled spring 20 disposed between the ferrule 18 and a ferrule carrier body 22. The ferrule 18 has through-holes (not visible) for receiving alignment pins 26 of a pin holder 24. A ribbon cable 12 having one or more ribbon fibers extends through the ferrule carrier body 22, the coiled spring 20, the pin holder 24 and is terminated in the ferrule 18. A crimp ring 28 is slidable over an end of the ferrule carrier body 22 to securely attach the MTP connector 10 to the ribbon cable 12 when crimped. A strain relief boot 30 is placed over the crimp ring 28 to protect the connection between the ribbon cable 12 and the MT ferrule assembly 16, as well as to provide strain relief for the ribbon cable 12.

The process for assembling the MTP connector 10 of FIG. 1 is generally as follows. The backing components, such as the strain relief boot 30, the crimp ring 28, the ferrule carrier body 22, the coiled spring 20, and the pin holder 24, are first assembled on the ribbon cable 12. After the outer jacket of the ribbon cable 12 has been stripped, the fibers are disposed in the ferrule 18. Ends of the fibers in the ferrule 18 are trimmed and the front surface of the ferrule 18 is polished so that the ends of the fibers are coplanar with the front surface. The rest of the connector 10 is then assembled.

The inventors of the present invention have recognized some disadvantages of the MTP connector discussed above. For example, when the backing components are assembled on the ribbon cable prior to termination of the fibers in the ferrule, any mistake during the assembly (e.g., missing a component) would result in the need for re-terminating the ferrule and the disposal of the backing components. As the costs for the ferrules and the termination are significant, this is a real concern. Also, because of the number of backing components and their assembly requirements, the process of assembly is difficult and costly and potential damage to the backing components is a common concern.

What is desired, therefore, is a ferrule assembly for a connector that can address these and other disadvantages of the present connectors.

SUMMARY OF THE INVENTION

The objects of the present invention are achieved in one embodiment by a ferrule assembly for terminating at least one fiber of a ribbon cable in a ferrule, where the ferrule assembly is disposable in a housing of an optical connector. The ferrule assembly includes the ferrule having a mating face, at least one groove for receiving the fiber and at least one through-hole. The ferrule assembly also includes an alignment member holder having at least one alignment member and providing a first channel for the ribbon cable, the alignment member being insertable in the through-hole of the ferrule and having a first length such that an end of the alignment member extends beyond the mating face of the ferrule when the ferrule assembly is assembled. The ferrule assembly further includes a carrier body attachable to the alignment member holder, the carrier body having at least two biasing member capture portions, each of the biasing member capture portions providing an opening for capturing a biasing member therein when the alignment member holder and the carrier body are attached. The carrier body further provides a second channel for the ribbon cable, the second channel being disposed between the biasing member capture portions of the carrier body and being contiguous with the first channel when the alignment member holder and the carrier body are attached.

DETAILED DESCRIPTION OF THE EMBODIMENTS

Figure 2:
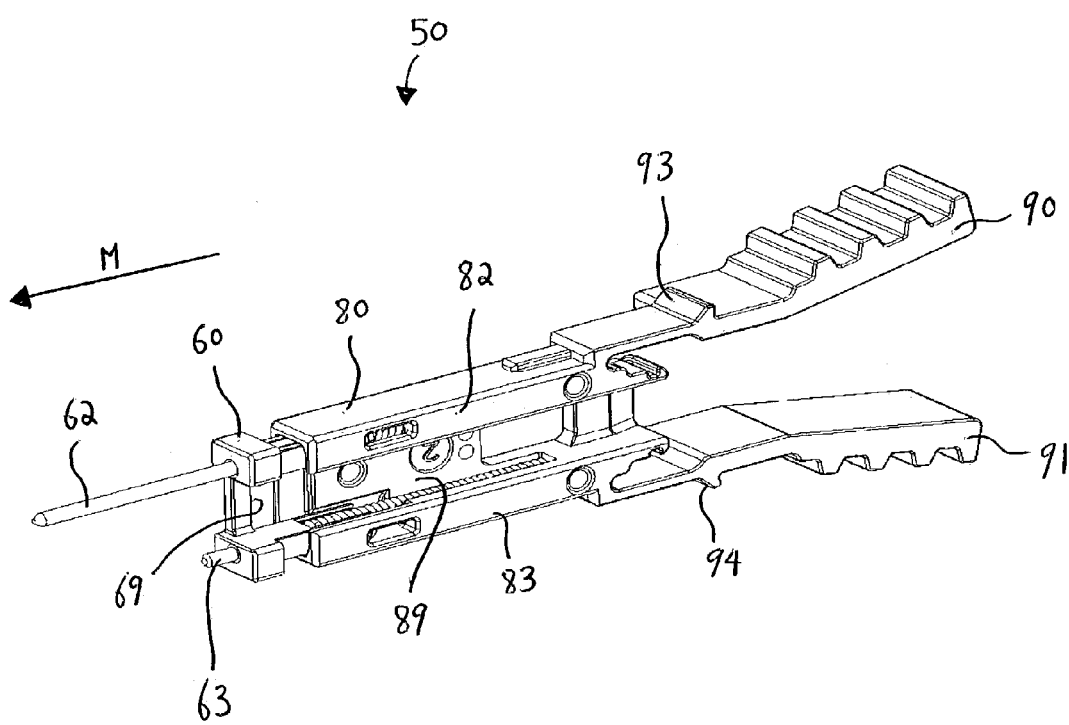
FIG. 2 is a perspective view of a ferrule assembly in accordance with the preferred embodiment of the present invention.

FIG. 2 shows a perspective view of a ferrule assembly in accordance with the preferred embodiment of the present invention. The ferrule assembly 50, which is disposable in a housing of an optical connector, generally includes an alignment member holder 60 and a carrier body 80. See FIGS. 5e and 5f for exemplary illustration of a housing of an optical connector.

Figure 4:
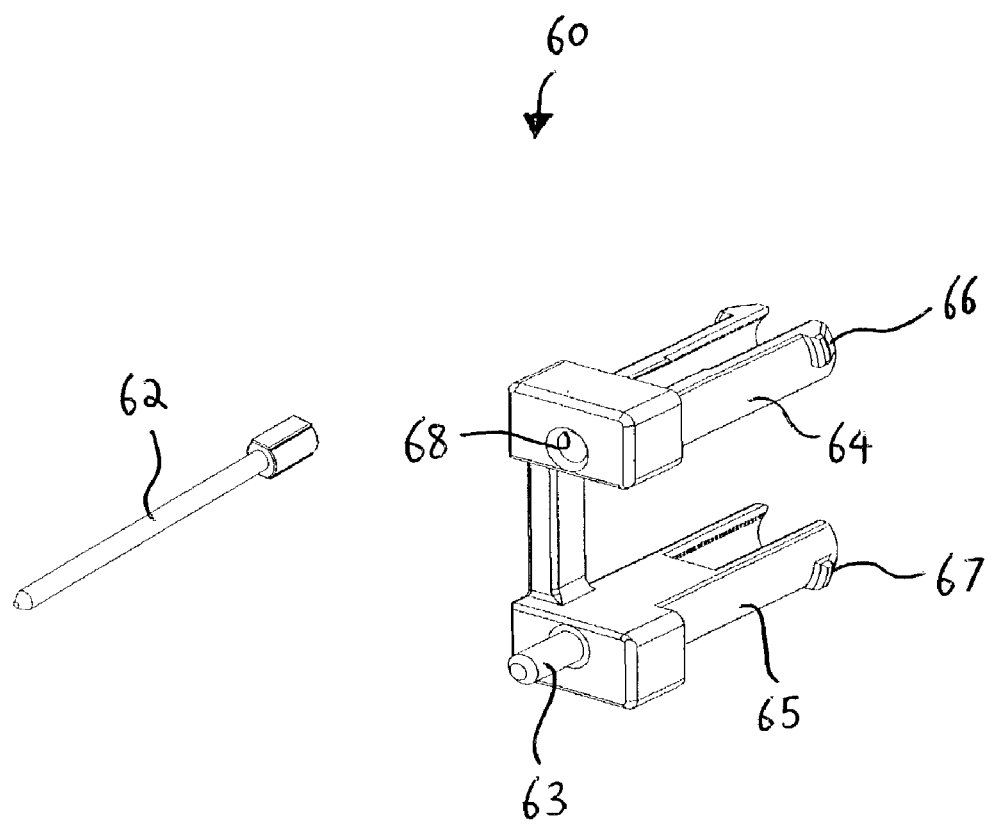
FIG. 4 is a perspective view of the alignment member holder of FIGS. 2 and 3.

The alignment member holder 60, which is shown in greater detail in FIG. 4, includes a first alignment member 62 and a second alignment member 63. As will be described in greater detail below, the first and second alignment members 62, 63 preferably have different lengths. The alignment member holder 60 also includes first and second guides 64, 65, with the first guide 64 having a latch member 66 and the second guide 65 having a latch member 67. While the figures show the latch members 66, 67 as two hook-like protrusions on opposite sides of the first and second guides 64, 65, it should be apparent to one of ordinary skill in the art that other latching methods and mechanisms may be employed without departing from the scope of the invention.

The alignment member holder 60 further includes a through-hole 68 through which the first alignment member 62 is inserted such that the end of the first alignment member 62 extends beyond the alignment member holder 60 in the mating direction M with a corresponding ferrule assembly. The alignment member holder 60 may also include another through-hole through which the second alignment member 63 is inserted. However, in the preferred embodiment of the invention, the second alignment member 63 is integrally formed with the alignment member holder 60. The alignment member holder 60 provides a first channel 69 for a ribbon cable (shown in FIGS. 5 and 6).

The carrier body 80 includes a first biasing member capture portion 82 and a second biasing member capture portion 83. The first biasing member capture portion 82 provides an opening (not numbered) for capturing a first biasing member 84 and the second biasing member capture portion 83 provides an opening (not numbered) for capturing a second biasing member 85. While the preferred embodiment of the invention shows the first and second biasing members 84, 85 as coiled springs, other biasing methods and mechanisms may be employed as known in the art.

Figure 3:
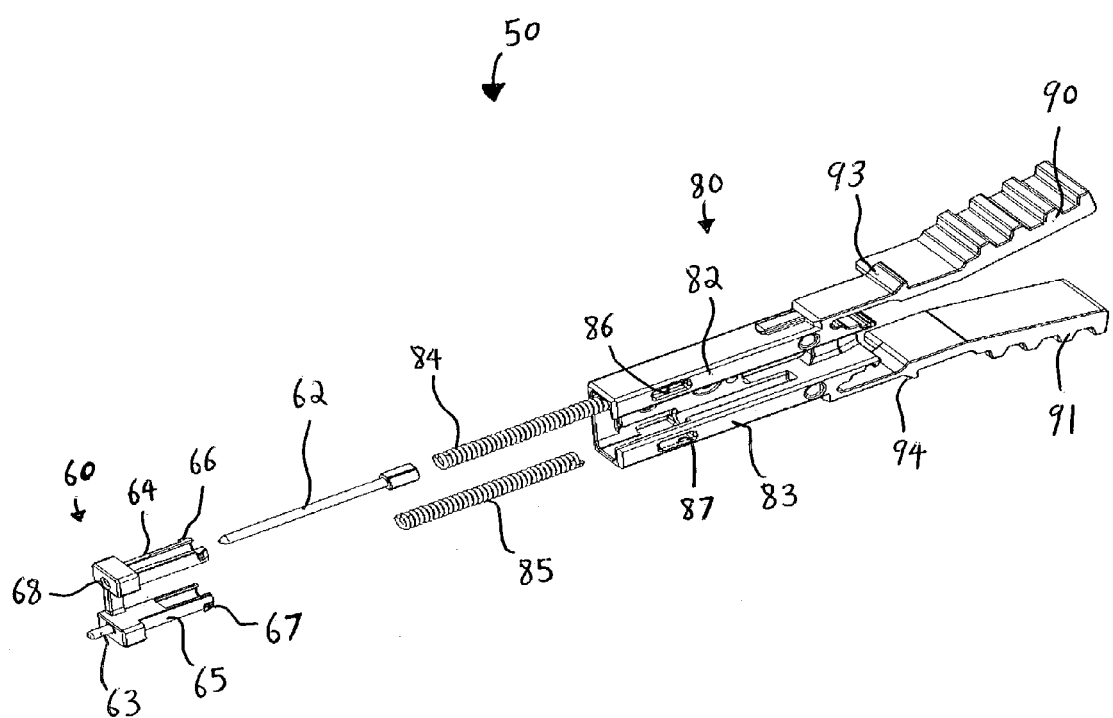
FIG. 3 is an exploded view of the ferrule assembly of FIG. 2.

FIG. 3 is an exploded view of the ferrule assembly 50 of FIG. 2, and shows the first and second biasing member capture portions 82, 83 more clearly. The first and second biasing member capture portions 82, 83 also includes slots 86, 87 to engage the latch members 66, 67, respectively, of the alignment member holder 60. The first and second guides 64, 65 of the alignment member holder 60 are insertable into the openings of the first and second biasing member capture portions 82, 83. And the slots 86, 87 are configured to engage the latch members 66, 67 so as to provide for slidable engagement between the alignment member holder 60 and the carrier body 80. The latch members 66, 67 and the slots 86, 87 are positioned such that in order to disengage the alignment member holder 60 from the carrier body 80, the biasing members 84, 85 must first be biased (compressed in the case of coiled springs). This prevents the accidental disengagement of the alignment member holder 60 from the carrier body 80.

The carrier body 80 provides a second channel 89 for the ribbon cable. The second channel 89 is preferably disposed between the first and second biasing member capture portions 82, 83 and is contiguous with the first channel 69 when the alignment member holder 60 and the carrier body 80 are engaged.

As shown in FIGS. 2 and 3, the carrier body 80 also includes a ferrule assembly release member, which is shown as first and second elongated, flexible grips 90, 91. While the preferred embodiment of the invention has two elongated, flexible grips, it should be apparent that one elongated grip may be used, as well as other number or mechanisms for manual actuation may be used. In the preferred embodiment, the ferrule assembly release member is integrally formed with the carrier body 80. The operation of the ferrule assembly release member will be described below.

The carrier body 80 further includes latches 93, 94 to enable the latching of the ferrule assembly 50 to the housing of the optical connector. This is shown and described with respect to FIGS. 5e and 5f. When a user grips and squeezes the elongated, flexible grips 90, 91 toward each other, the latches 93, 94 become disengaged from the housing of the optical connector, thereby enabling the ferrule assembly 50 to be disengaged from the optical connector housing. One latch, more than two latches, or other mechanisms for latching may be used instead for latching the ferrule assembly 50 the optical connector housing.

Figure 1:
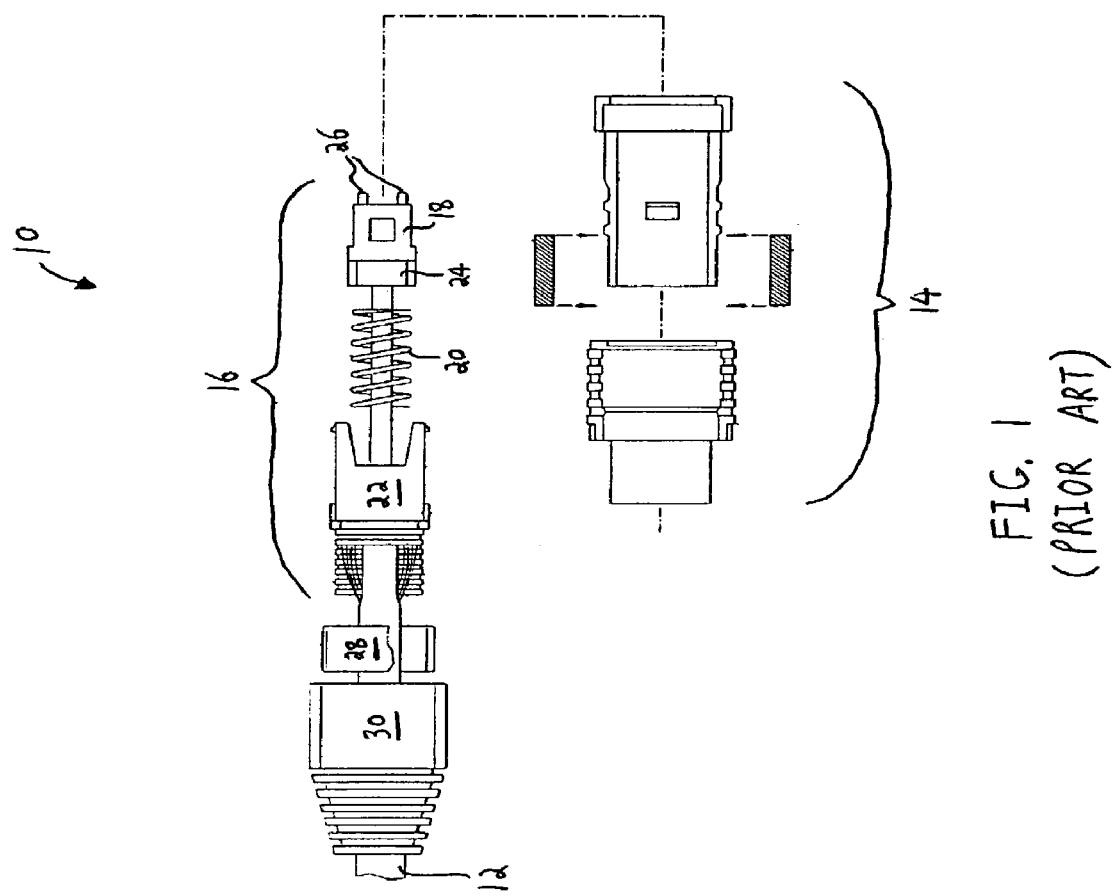
FIG. 1 shows a prior art MTP connector as illustrated in FIG. 2 of U.S. Pat. No. 5,806,175.

FIGS. 5a–5f show a method for terminating a ribbon cable 100 in a ferrule 110 and assembling an optical connector 150. Unlike the prior art MTP connector 10 of FIG. 1, the ferrule assembly 50 of the present invention allows the ribbon cable 100 to be first terminated in the ferrule 110 before any backing components must be assembled on the ribbon cable 100. As known in the art, the process of terminating the ribbon cable in the ferrule includes stripping an outer jacket of the ribbon cable, disposing the one or more fibers of the ribbon cable in the ferrule, trimming the ends of the fibers and polishing the ends of the fibers.

Figure 5A:
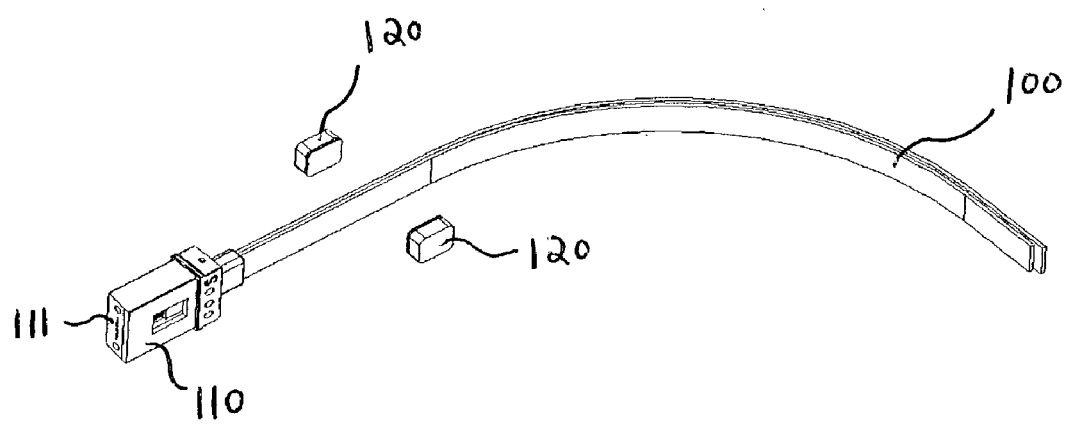
FIGS. 5a–5f show a method for terminating a ribbon cable in a ferrule and assembling an optical connector.
Figure 5B:
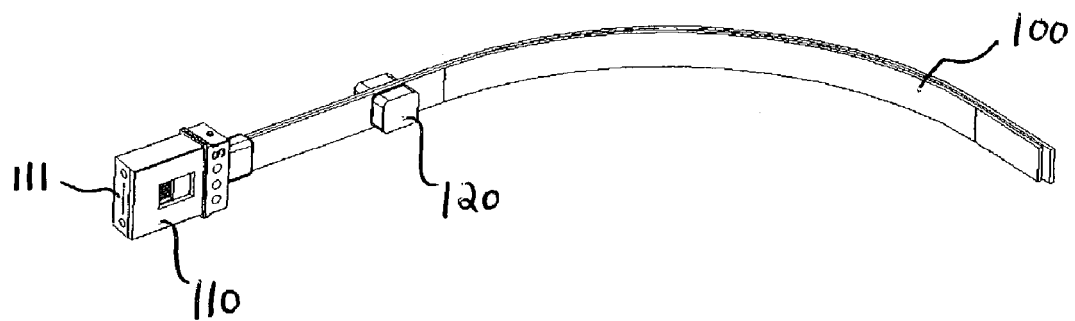

FIGS. 5a and 5b illustrate a dust seal member 120 being provided to the ribbon cable 100. While this step is optional, it is desired to have this step to provide better dust protection to the ferrule assembly. The dust seal member 120 may be attached to the ribbon cable 100 by use of an adhesive agent or by other means known in the art. Preferably, the dust seal member 120 is a Teflon® adhesive-coated insert or the like that adheres to the ribbon cable 100. Note that the dust seal member 120 could also be made from a porous filter material, which can block sub-micron particles but allow air to pass. This would allow the ferrule assembly to be cleaned by a vacuum or the like.

Figure 5C:
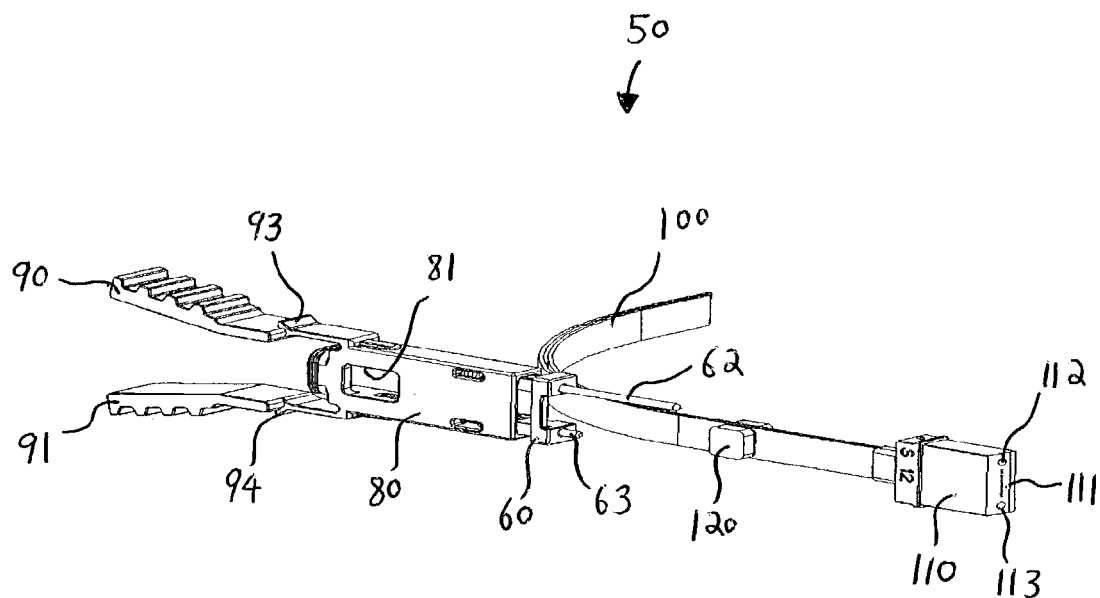
Figure 5D:
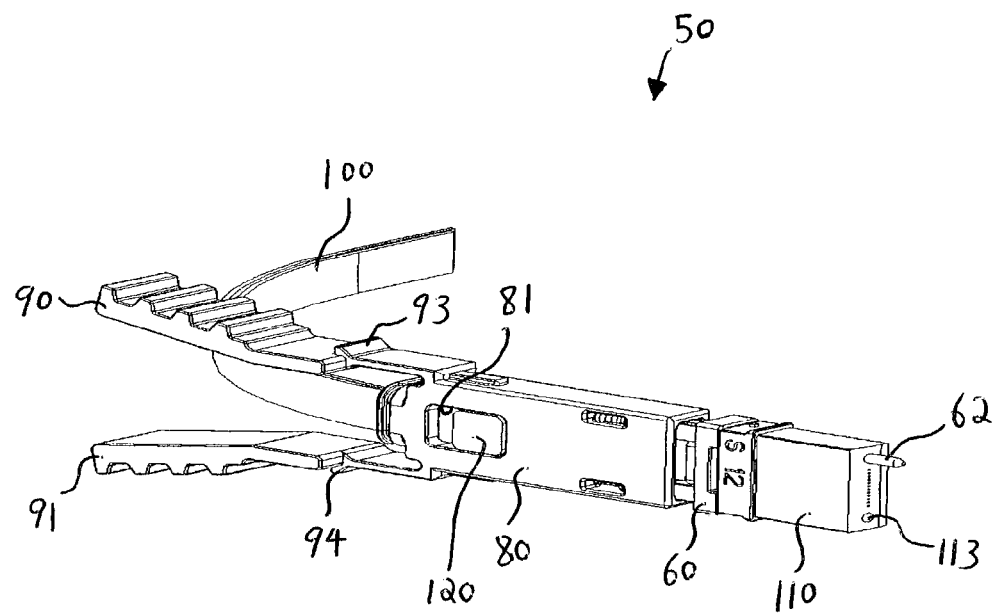

The ferrule 110 is provided with a first through-hole 112 and a second through-hole 113. Reference numeral 111 indicates a mating face of the ferrule 110. After the alignment member holder 60 is preferably attached to the carrier body 80, the ferrule 110 with the terminated ribbon cable 100 is then disposed on the alignment member holder 60. The first alignment member 62 is inserted in the first through-hole 112 and the second alignment member 63 is inserted in the second through-hole 113. This is shown in FIGS. 5c and 5d. Due to the different lengths of the first and second alignment members 62, 63, the first alignment member 62 extends beyond the mating face 111 of the ferrule 110 while the second alignment member 63 stays within the second through-hole 113 and is recessed from the mating face 111 of the ferrule 110.

The ribbon cable 100 is disposed in the first channel 69 of the alignment member holder 60 and the second channel 89 of the carrier body 80 (see FIG. 2). Along the second channel 89 of the carrier body 80, there is provided a cut-out 81 for engaging the dust seal member 120. The cut-out 81 is sized relative to the dust seal member 120 to provide some slidability of the ribbon cable 100.

Figure 5E:
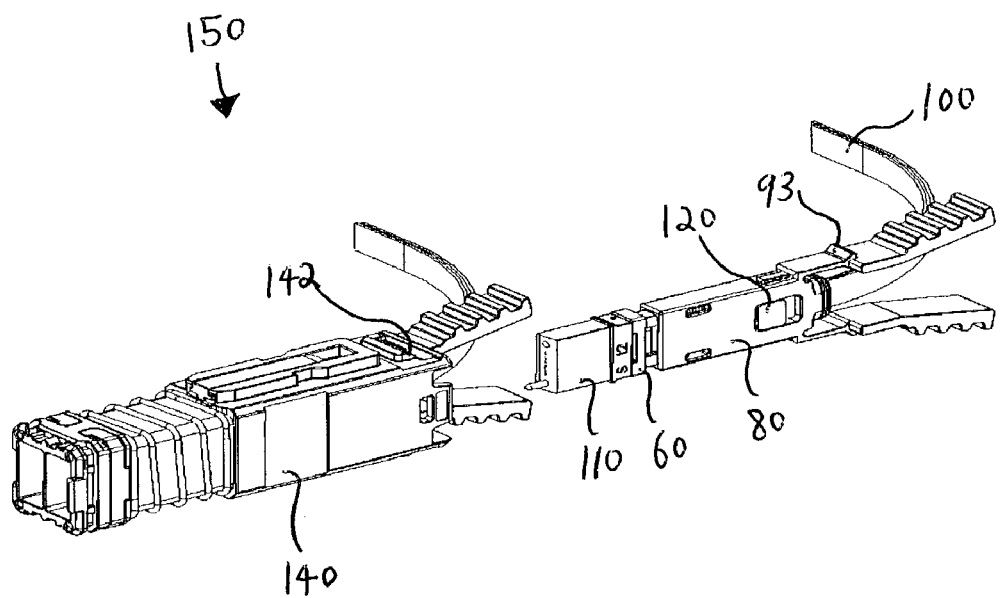
Figure 5F:
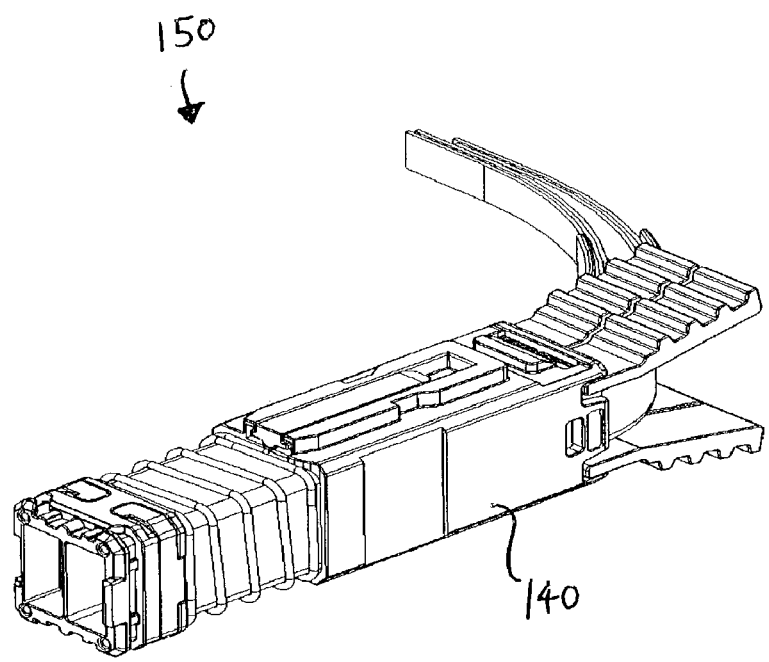

FIGS. 5e and 5f show the assembled ferrule 110, alignment member holder 60 and the carrier body 80 disposed in a housing 140 of an optical connector 150. As shown, the housing 140 is configured to receive two ferrule assemblies 50. Such an optical connector is referred to as a "duplex" connector. Note that while the connector shown is a duplex connector, the ferrule assembly of the present invention may work with any connector configuration and is not intended to be limited to a duplex connector. The housing 140 includes slots 142 (bottom slot not visible) to removably engage the latches 93, 94 of the carrier body 80.

Figure 6:
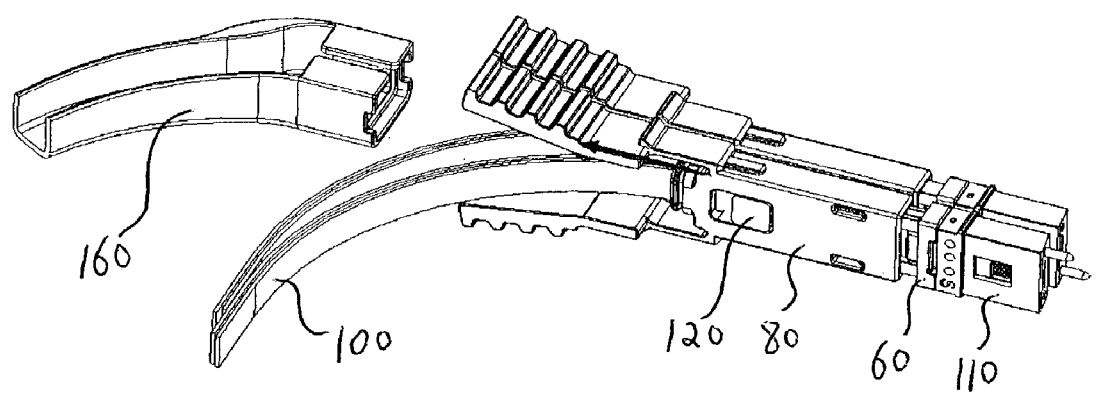
FIG. 6 is a perspective view, of the ferrule assembly of FIG. 2 with a strain relief member.

FIG. 6 is a perspective view of the ferrule assembly of the present invention, with a strain relief member 160. The strain relief member 160 includes a curved channel to provide strain relief to the ribbon cable 100. Note that the strain relief member 160 is configured for a duplex connector. However, the strain relief member may be configured for any number of ferrule assemblies.

Some of the advantages of the ferrule assembly of the present invention have been described in the Background Of The Invention section. However, there are additional advantages provided by the present invention. For example, unlike existing designs in which the biasing member of the carrier body is exposed, the biasing members 84, 85 of the present invention are not exposed but rather disposed in biasing member capture portions 82, 83. This reduces potential for component damage and provides a more stable movement in the mating direction. Also, because of the different lengths of the first and second alignment members 62, 63, the ferrule assembly of the present invention allows for hermaphroditic mating. The position of the first and second alignment members would be reversed on the mating ferrule assembly to allow the longer alignment member to be received in the ferrule through-hole occupied by the shorter alignment member of the mating ferrule assembly and vice-versa. The hermaphroditic nature of the mating ferrule assemblies reduces the number of components necessary, makes inventory easier and facilitates manufacture and assembly. Still another advantage of the present invention is that the alignment member holder is guided in the carrier body to allow movement only in the mating axis. This aids in finer ferrule alignment.

While the ferrule assembly of the present invention has been designed for a ferrule having at least one through-hole for receiving an alignment member, it would be apparent to one of ordinary skill in the art that the present invention may also be used for a ferrule having no through-hole. In this case, the alignment member holder would not have any alignment members. Thus, the alignment member holder may also be referred to as a "ferrule holder". In addition, while the preferred embodiment is to have a biasing member in each of the biasing member capture portions, the present invention can also function with only one of the biasing member capture portions having a biasing member. Thus, the biasing member capture portions may also be referred to as "guide receiving portions" herein.

Having thus described the preferred embodiment of the present invention with sufficient particularity to enable those skilled in the art to make and use the invention, and having described variations and modifications of the preferred embodiment, it should nevertheless be appreciated that still further variations and modifications of the invention are possible, and that all such variations and modifications should be considered within the scope of the invention.

What is claimed is:

1. A ferrule assembly disposable in a housing of an optical connector, the ferrule assembly for terminating at least one fiber of a ribbon cable in a ferrule comprising:
    the ferrule having a mating face, at least one groove for receiving the fiber and at least one through-hole;
    an alignment member holder having at least one alignment member and providing a first channel for the ribbon cable, the alignment member being insertable in the through-hole of the ferrule and having a first length such that an end of the alignment member extends beyond the mating face of the ferrule when the ferrule assembly is assembled;
    a carrier body receiving at least a portion of the alignment member holder through a front opening thereof, the carrier body having at least two biasing member capture portions, each of the biasing member capture portions providing an opening for capturing a biasing member therein when the alignment member holder and the carrier body are attached; and
    the carrier body further providing a second channel for the ribbon cable, the second channel being disposed between the biasing member capture portions of the carrier body and being contiguous with the first channel when the alignment member holder and the carrier body are attached.

2. The ferrule assembly of claim 1, wherein the alignment member holder includes first and second guides insertable into the openings of the biasing member capture portions such that when the alignment member holder and the carrier body are attached, the alignment member holder is movable only along the mating axis.

3. The ferrule assembly of claim 2, wherein the first and second guides of the alignment member holder include at least one latch member to slidably attach the alignment member holder to the carrier body.

4. The ferrule assembly of claim 3, wherein the latch member for the first and second guides is positioned on the first and second guides such that in order to disengage the alignment member holder from the carrier body, the biasing members of the carrier body must be biased.

5. The ferrule assembly of claim 1, wherein the alignment member holder includes a through-hole and the alignment member is inserted into the through-hole of the alignment member holder such that the end of the alignment member extends beyond the alignment member holder in the direction of the ferrule.

6. The ferrule assembly of claim 1, wherein the ferrule further includes a second through-hole and the alignment member holder further includes a second alignment member, the second member being insertable in the second through-hole of the ferrule and having a second length such that an end of the second alignment member stays within the second through-hole and is recessed from the mating face of the ferrule when the ferrule assembly is assembled.

7. The ferrule assembly of claim 6, wherein the second alignment member is integrally formed with the alignment member holder.

8. The ferrule assembly of claim 1, wherein the carrier body further includes a ferrule assembly release member, the actuation of which allows the ferrule assembly to be removable from the housing of the optical connector.

9. The ferrule assembly of claim 8, wherein the ferrule assembly release member is integrally formed with the carrier body.

10. The ferrule assembly of claim 8, wherein the ferrule assembly release member comprises at least one elongated, flexible grip.

11. The ferrule assembly of claim 8, wherein the ferrule assembly release member comprises two elongated, flexible grips.

12. The ferrule assembly of claim 1, wherein the carrier body further includes at least one latch to latch the ferrule assembly to the housing of the optical connector.

13. The ferrule assembly of claim 1, wherein the carrier body further includes at least two latches to latch the ferrule assembly to the housing of the optical connector.

14. The ferrule assembly of claim 1, which further comprises a dust seal member provided to the ribbon cable, the dust seal member engaging a dust seal engagement portion of the carrier body.

15. The ferrule assembly of claim 14, wherein the dust seal engagement portion is defined by a cut-out along the second channel.

16. A ferrule assembly according to claim 1, wherein the alignment member is movable axially within the alignment member holder when the alignment member holder and the carrier body are attached.

17. An optical connector assembly which comprises:
    a first optical connector for terminating at least one fiber of a first ribbon cable in a first ferrule, the first optical connector including:
    the first ferrule having a mating face, at least one groove for receiving the fiber of the first ribbon cable and at least one through-hole;
    a first alignment member holder having at least one alignment member and providing a first channel for the first ribbon cable, the alignment member being insertable in the through-hole of the first ferrule and having a first length such that an end of the alignment member extends beyond the mating face of the first ferrule when inserted in the through-hole of the first ferrule;

a first carrier body attachable to the first alignment member holder, the first carrier body having at least two biasing member capture portions, each of the biasing member capture portions providing an opening for capturing a biasing member therein when the first alignment member holder and the first carrier body are attached;

the first carrier body further providing a second channel for the first ribbon cable, the second channel being disposed between the biasing member capture portions of the first carrier body and being contiguous with the first channel when the first alignment member holder and the first carrier body are attached;

a first housing to receive the first ferrule, first alignment member holder and first carrier body; and a strain relief member, the strain relief member attachable to the first housing to provide strain relief to the first ribbon cable.

18. The optical connector assembly of claim 17, wherein the first alignment member holder includes first and second guides insertable into the openings of the biasing member capture portions such that when the first alignment member holder and the first carrier body are attached, the first alignment member holder is movable only along the mating axis.

19. The optical connector assembly of claim 17, wherein the first alignment member holder includes a through-hole and the alignment member inserted into the through-hole of the first alignment member holder such that the end of the alignment member extends beyond the first alignment member holder in the direction of the first ferrule.

20. The optical connector assembly of claim 17, wherein the first ferrule further includes a second through-hole and the first alignment member holder further includes a second alignment member, the second alignment member being insertable in the second through-hole and having a second length such that an end of the second alignment member stays within the second through-hole and is recessed from the mating face of the first ferrule when the first optical connector is assembled.

21. The optical connector assembly of claim 17, wherein the first carrier body further includes a ferrule assembly release member, the actuation of which allows the first carrier body to be removable from the first housing of the first optical connector.

22. The optical connector assembly of claim 17, wherein the first carrier body further includes at least one latch to latch the first carrier body to the first housing of the first optical connector.

23. The optical connector assembly of claim 17, which further comprises a first dust seal member provided to the first ribbon cable, the first dust seal member engaging a dust seal engagement portion of the first carrier body.

24. The optical connector assembly of claim 17, which further comprises:

a second optical connector for terminating at least one fiber of a second ribbon cable in a second ferrule, the second optical connector mateable with the first optical connector and including:

the second ferrule having a mating face, at least one groove for receiving the fiber of the second ribbon cable and at least one through-hole;

a second alignment member holder having at least one alignment member and providing a first channel for the second ribbon cable, the alignment member being insertable in the through-hole of the second ferrule and having a third length such that an end of the alignment member extends beyond the mating face of the second ferrule when inserted in the through-hole of the second ferrule;

a second carrier body attachable to the second alignment member holder, the second carrier body having at least two biasing member capture portions, each of the biasing member capture portions providing an opening for capturing a biasing member therein when the second alignment member holder and the second carrier body are attached;

the second carrier body further providing a second channel for the second ribbon cable, the second channel being disposed between the biasing member capture portions of the second carrier body and being contiguous with the first channel when the second alignment member holder and the second carrier body are attached; and a second housing to receive the second ferrule, second alignment member holder and second carrier body.

25. The optical connector assembly of claim 24, wherein the first ferrule is identical to the second ferrule, the first alignment member holder is identical to the second alignment member holder, and the first carrier body is identical to the second carrier body.

26. The optical connector assembly of claim 17, wherein the strain relief member includes a curved channel.

27. An optical connector assembly according to claim 17, wherein the alignment member is movable axially within the first alignment member holder when the first alignment member holder and the carrier body are attached.

28. A ferrule assembly disposed in a housing of an optical connector, the ferrule assembly for terminating at least one fiber of a ribbon cable in a ferrule, comprising:

the ferrule having a mating face and at least one groove for receiving the fiber;

a ferrule holder having at least two guides and providing a first channel for the ribbon cable;

a carrier body attachable to the ferrule holder, the carrier body having at least two guide receiving portions, each of the guide receiving portions providing an opening receiving one of the guides of the ferrule holder through a front opening of the carrier body;

at least one of the guide receiving portions of the carrier body having a biasing member in the opening; and the carrier body further providing a second channel for the ribbon cable, the second channel being disposed between the guide receiving portions of the carrier body and being contiguous with the first channel when the ferrule holder and the carrier body are attached.

29. A ferrule assembly according to claim 28, further comprising:

an alignment member receivable in the ferrule holder; and the alignment member being movable axially within the ferrule holder when the ferrule holder and the carrier body are attached.

30. A ferrule assembly disposable in a housing of an optical connector, the ferrule assembly for terminating at least one fiber of a ribbon cable in a ferrule comprising:

the ferrule having a mating face, at least one groove for receiving the fiber and at least one through-hole;

an alignment member holder having at least one alignment member and providing a first channel for the ribbon cable, the alignment member being insertable in the through-hole of the ferrule and having a first length such that an end of the alignment member extends beyond the mating face of the ferrule when the ferrule assembly is assembled;

a carrier body attachable to the alignment member holder, the carrier body having at least two biasing member capture portions, each of the biasing member capture portions providing an opening for capturing a biasing member therein when the alignment member holder and the carrier body are attached;

the carrier body further providing a second channel for the ribbon cable, the second channel being disposed between the biasing member capture portions of the carrier body and being contiguous with the first channel when the alignment member holder and the carrier body are attached; and wherein the ferrule further includes a second through-hole and the alignment member holder further includes a second alignment member, the second alignment member being insertable in the second through-hole of the ferrule and having a second length such that an end of the second alignment member stays within the second through-hole and is recessed from the mating face of the ferrule when the ferrule assembly is assembled.

31. A ferrule assembly disposable in a housing of an optical connector, the ferrule assembly for terminating at least one fiber of a ribbon cable in a ferrule comprising:

the ferrule having a mating face, at least one groove for receiving the fiber and at least one through-hole;

an alignment member holder having at least one alignment member and providing a first channel for the ribbon cable, the alignment member being insertable in the through-hole of the ferrule and having a first length such that an end of the alignment member extends beyond the mating face of the ferrule when the ferrule assembly is assembled;

a carrier body attachable to the alignment member holder, the carrier body having at least two biasing member capture portions, each of the biasing member capture portions providing an opening for capturing a biasing member therein when the alignment member holder and the carrier body are attached;

the carrier body further providing a second channel for the ribbon cable, the second channel being disposed between the biasing member capture portions of the carrier body and being contiguous with the first channel when the alignment member holder and the carrier body are attached; and a dust seal member provided on the ribbon cable, the dust seal member engaging a dust seal engagement portion of the carrier body.

* * * * *